Nov. 13, 1951  R. D. SMITH  2,575,194
MOTOR VEHICLE FRAME ALIGNMENT MEASURING MECHANISM
Original Filed Sept. 21, 1945  2 SHEETS—SHEET 1
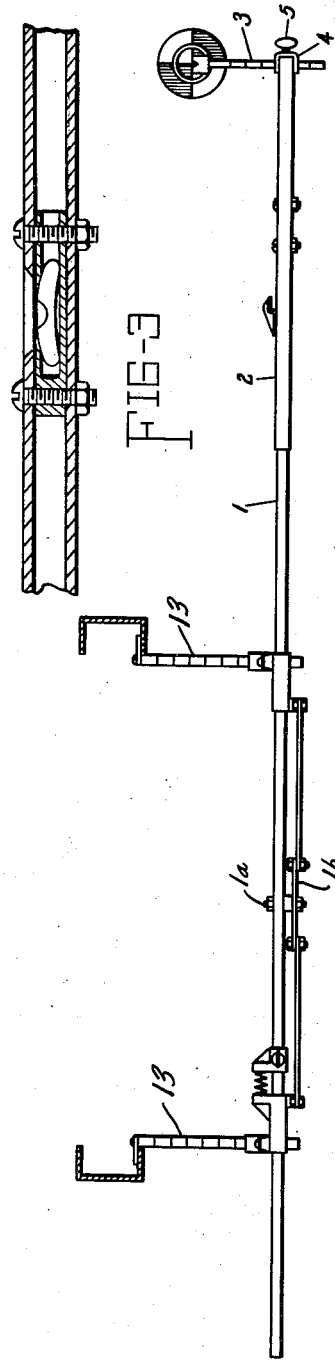
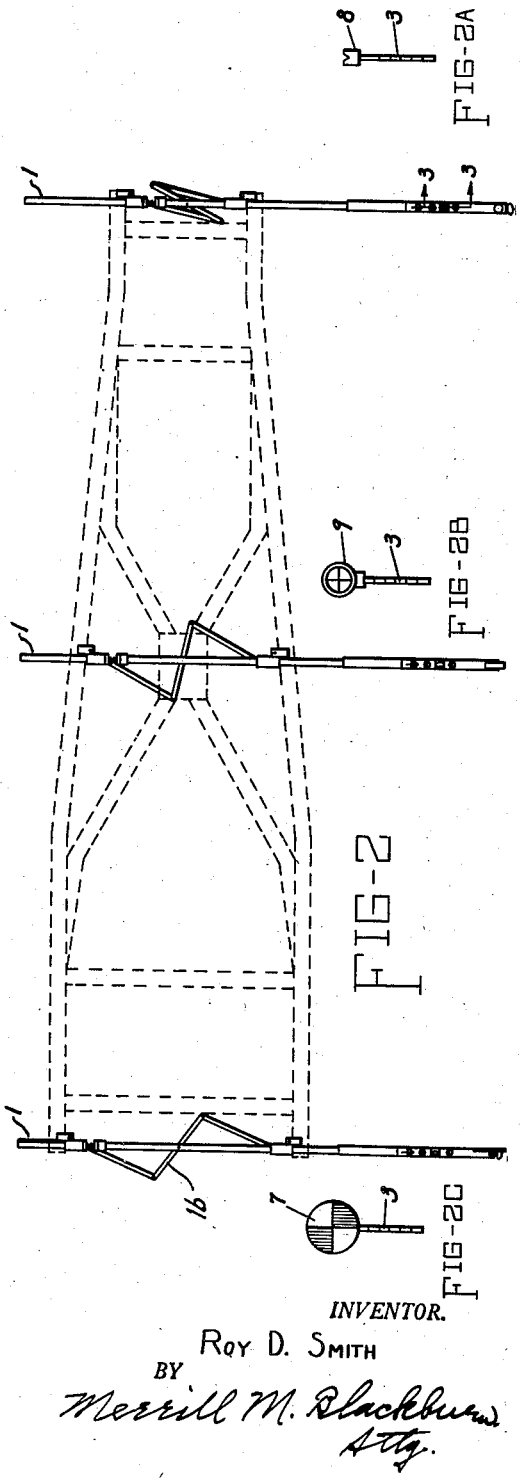
INVENTOR.
Roy D. Smith
BY Merrill M. Blackburn
Atty.

Nov. 13, 1951  R. D. SMITH  2,575,194
MOTOR VEHICLE FRAME ALIGNMENT MEASURING MECHANISM
Original Filed Sept. 21, 1945  2 SHEETS—SHEET 2
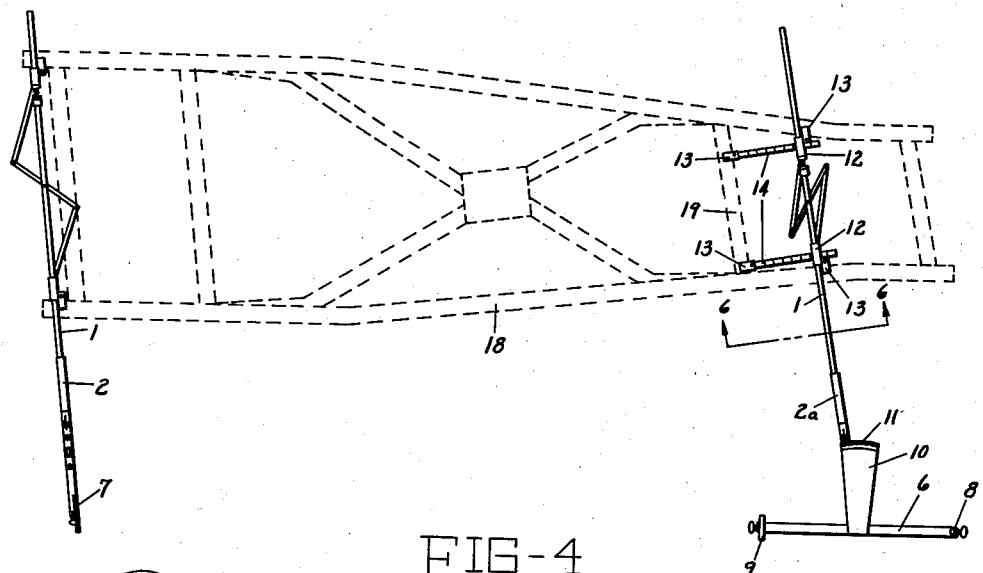
FIG-4
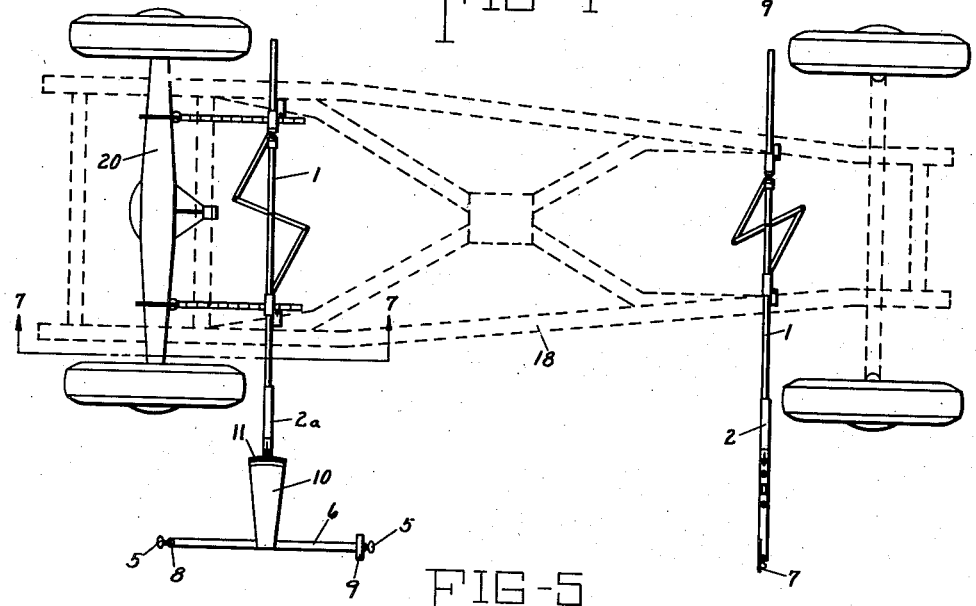
FIG-5
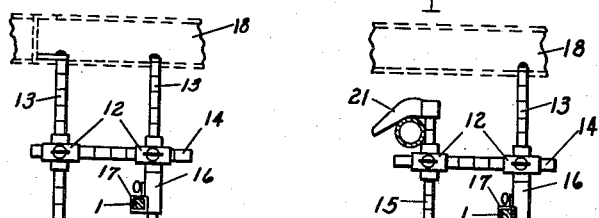
FIG-6  FIG-7
INVENTOR.
Roy D. Smith
BY
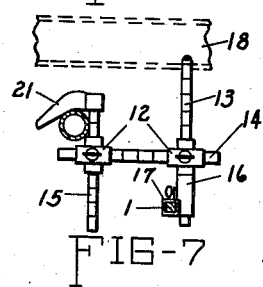

Patented Nov. 13, 1951

2,575,194

UNITED STATES PATENT OFFICE 2,575,194

MOTOR VEHICLE FRAME ALIGNMENT MEASURING MECHANISM

Roy D. Smith, Pueblo, Colo., assignor to Bee-Line Company, Scott County, Iowa, a copartnership Substituted for original application September 21, 1945, Serial No. 617,822. Divided and this application March 24, 1947, Serial No. 736,711. In Canada March 10, 1947

2 Claims. (Cl. 33—46)

The present disclosure relates to an apparatus for use in determining the correctness or incorrectness of the form of the frame and/or running gear of a motor vehicle, is a substitute for abandoned application, Serial No. 617,822, filed September 21, 1945, and is in the nature of an improvement upon the apparatus shown in my Patent No. 2,070,518, issued February 9, 1937, and that shown in my Patent No. 2,401,980, issued June 11, 1946. Like the structure of the latter patent, the present apparatus removes the observation line from beneath the vehicle to a point at one side thereof, thus making observation much more easy.

One object of this invention is to provide more easily visible targets than those disclosed in my Patent No. 2,401,980, referred to above. Other objects are the provision of an apparatus by means of which the correctness or incorrectness of location of a motor vehicle axle can be quickly determined, together with the amount of error, if there should prove to be such; the provision of an apparatus by means of which, if a motor vehicle chassis has been distorted from its correct angular form, the amount of such distortion can be easily determined and the correctness of form can be easily shown as soon as it has been reestablished; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention and a modified form thereof, I desire the same to be understood as illustrative only and not to be interpreted in a limiting sense.

In the drawings annexed hereto and forming a part hereof:

Fig. 1 represents a side elevation of an apparatus in accordance with my invention in which the three sighting units are shown in alignment;

Fig. 2 represents a plan view of the structure shown in Fig. 1, the motor vehicle frame being shown by broken lines;

Figs. 2A, 2B, and 2C represent, in front elevation, the three targets of the sighting device;

Fig. 3 represents a fragmentary longitudinal section of a target supporting bar with a leveling tube shown mounted therein, the same being taken substantially along the plane indicated by the line 3—3, Fig. 2;

Fig. 4 represents the preferred form of this apparatus applied to a distorted vehicle frame in checking what is commonly referred to as "diamond frame";

Fig. 5 represents the apparatus shown in Fig. 4 as being used to determine the correctness or incorrectness of the location of a vehicle axle with relation to the frame;

Fig. 6 represents a sectional elevation substantially along the plane indicated by the line 6—6, Fig. 4; and Fig. 7 represents a sectional elevation substantially along the plane indicated by the line 7—7, Fig. 5.

Reference will now be made in greater detail to the annexed drawings for a more complete description of this invention. The supporting structure shown in Figs. 1 and 2 is similar to that disclosed in my Patent No. 2,401,980, referred to above, although there are slight differences. For example, the leveling tube 9 is no longer mounted on top of the supporting bar but, as shown in Fig. 3 of the instant application, it is placed inside of the supporting bar. Also, in the present construction, the supporting bar is made up of two sections 1 and 2, the latter being hollow and receiving therein the section 1, the two being secured together. The three supporting structures shown in Figs. 1 and 2 are identical but the sighting devices differ for a reason presently to be disclosed. The bar 1 is supported by hangers or abutments 13 which engage the frame members of the vehicle, as shown in Fig. 1, and suspend the bar therefrom. This bar has a pivot member 1a mounted therein on which lever 1b is pivoted, as disclosed fully in my Patent No. 2,401,980.

Each of the sighting devices comprises a graduated post or standard 3 which extends through openings in the arms of the U-shaped clip 4 and through the end of the bar 2. A set screw 5 passes through the clip 4 and bears against the standard 3, thus making possible the vertical adjustment of the sighting device and the securement thereof in adjusted position. If the clip 4 is put on the bar 2 transversely thereof instead of longitudinally, as shown, the set screw 5 will bear against the side of the bar 2 instead of against the standard 3. In prior devices in which targets or sighting devices are identical, it is difficult to identify them and know when they are properly aligned. However, as shown in Fig. 2, where the three devices are shown in alignment, it is easy to see the three and identify them. Also, the V-shaped notch in the structure of Fig. 2A is comparable to a gun sight and it is possible to easily and quickly line this up with the cross-wires of the structure shown in Fig. 2B and with the cross-lines of the target shown in Fig. 2C. With the sighting devices shown in these drawings, work is made easier and is accelerated.

Reference will now be made to sheet 2 of the drawings for a description of the structure and operation there shown. In this construction, the bars 1 and 2 are identical with those shown on sheet 1 but bar 2a has a different type of sighting device pivotally mounted at the end thereof to swing in a horizontal direction. This may comprise a telescope or short bar 6 having at its two ends sighting devices such as shown in Figs. 2A and 2B, these being mounted for vertical adjustment to bring them and the target 7 into vertical alignment. When the sighting devices 8 and 9 of Figs. 2A and 2B are used, they are preferably mounted as shown in Fig. 5. In this construction, the sector 10 is mounted on the bar 6 which is pivotally connected to the end of the bar 2a to swing in a horizontal direction, as is clear by a comparison of Figs. 4 and 5. As indicated at 11, the edge portion of the sector 10 is graduated in degrees so that the amount of angle between the axis of the supporting bar 1, 2a and the axis of the sector 10 may be read directly from the gaduations 11 which cooperates with an indicator mark on the top of the bar 2a.

As shown in Figs. 6 and 7, the connectors 12 through which the hangers 13 pass differ somewhat from the comparable structure in my Patent No. 2,401,980. These connectors comprise two sleeves secured together at right angles to each other, one of which is for the reception of hanger 13 or hanger 15. The hangers 13 are substantially identical with the hangers 14 of my Patent No. 2,401,980. A sleeve 16 is adjustably mounted on the hanger 13 and carries a sleeve 17 through which the bar 1 passes. It is clear from Figs. 4 and 5 that the supporting bar 1 may be hung from the vehicle body frame 18, as described in my Patent No. 2,401,980.

It is shown in Figs. 4 and 6 that a bar 14 passes through two connectors 12 supporting a pair of hangers 13, one of them being in position for engagement with a cross-frame member 19, as shown in Fig. 4. If the two bars 14, connected with opposite sides of the vehicle, are adjusted identically in the connectors or sleeves 12 through which they pass, the bar 1 will be parallel to the cross-frame member 19. Now, if the sight line of the sighting device 6 is turned to be intersected by the center of the target 7, this sight line will be parallel with the longitudinal axial line of the vehicle, if the apparatus has been properly set, beforehand, and the frame is straight. However, as is clear from Fig. 4, the indicator on bar 2a will no longer read zero on the scale 11, if the vehicle frame has been distorted. This indicates the necessity for forcing the vehicle frame into rectangular form, for which purpose there are many constructions. Because of this fact, it is not necessary to describe the operation of correcting "diamond frame."

The apparatus illustrated in Figs. 5 and 7 is used for determining whether the axle housing 20 is at a right angle to the axial line of the vehicle. This apparatus is identical with that above described except that the hanger 15 is provided at its upper end with a hook 21 for engagement over the axle housing 20. Use of this apparatus in the way shown in Figs. 5 and 7 will indicate quickly whether the axle housing has shifted any with relation to the vehicle frame. If it has, then it is necessary to make the correction needed to bring it back into proper position.

It will of course be understood that the specific description of structure set forth above may be departed from without departing from the spirit of this invention as set forth in this specification and the appended claims.

Having now described my invention, I claim:

1. A sighting device to be used as a part of a gauge in checking the form of a motor vehicle frame and running gear, comprising an elongated bar having adjacent one end a sighting means and toward the other end a pivot member, said sighting means determining a line of sight, a pair of abutments to engage the side frame members of a motor vehicle, said abutments being located on and for sliding movement along said bar upon opposite sides of said pivot member, and means connecting said abutments to said pivot member to insure equal and opposite motion of the abutments when one is moved, said bar having laterally spaced abutment means extending transversely of the bar and adapted to engage a fixed part of the vehicle and hold the bar spaced from said part and parallel thereto, the sighting means on said bar being pivotally connected thereto adjacent one end thereof and being provided with means for determining the angular relation between the axis of the bar and the line of sight of the sighting means.

2. Sighting means for use in motor vehicle gauging, comprising an elongated bar for suspension beneath the vehicle, said bar having an opening through an end thereof which is to protrude beyond the side of the vehicle when in use, a clip engaging about the apertured end of the bar and having openings therethrough which align with the opening in the bar, a target having a standard extending through the openings in the bar and clip, and a set screw passing through the clip and engaging said standard and holding the standard in adjusted position with relation to the bar.

ROY D. SMITH.

REFERENCES CITED

The following references are of record in the file of this patent:

UNITED STATES PATENTS

| Number | Name | Date |
| --- | --- | --- |
| 685,455 | Kinkead | Oct. 29, 1901 |
| 958,736 | Ferris | May 24, 1910 |
| 1,336,010 | Wingate | Apr. 6, 1920 |
| 1,401,200 | Smith | Dec. 27, 1921 |
| 1,903,333 | Botel | Apr. 4, 1933 |
| 2,000,866 | Smith | May 7, 1935 |
| 2,070,518 | Smith | Feb. 9, 1937 |
| 2,401,980 | Smith | June 11, 1946 |